United States Patent
Wu et al.

(10) Patent No.: US 11,394,593 B2
(45) Date of Patent: Jul. 19, 2022

(54) DATA CHANNEL TRANSMISSION METHOD, DATA CHANNEL RECEIVING METHOD, AND APPARATUS

(71) Applicant: Huawei Technologies Co., Ltd., Shenzhen (CN)

(72) Inventors: Yiqun Wu, Shanghai (CN); Xiaomeng Chai, Shanghai (CN); Yan Chen, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 17/073,062

(22) Filed: Oct. 16, 2020

(65) Prior Publication Data

US 2021/0036904 A1 Feb. 4, 2021

Related U.S. Application Data

(63) Continuation of application No. PCT/CN2019/082778, filed on Apr. 15, 2019.

(30) Foreign Application Priority Data

Apr. 18, 2018 (CN) .......................... 201810350367.4

(51) Int. Cl.
*H04L 27/26* (2006.01)
*H04W 74/08* (2009.01)
*H04W 28/06* (2009.01)

(52) U.S. Cl.
CPC ...... *H04L 27/2613* (2013.01); *H04L 27/2607* (2013.01); *H04W 74/0833* (2013.01); *H04W 28/06* (2013.01)

(58) Field of Classification Search
CPC ... H04L 27/2607; H04L 27/2613; H04L 5/00; H04L 5/0048; H04W 74/0833; H04W 28/06
See application file for complete search history.

(56) References Cited

U.S. PATENT DOCUMENTS

| 2018/0097590 A1 | 4/2018 | Ly et al. |
| 2019/0215781 A1* | 7/2019 | Jeon ...................... H04W 24/10 |
| 2020/0137792 A1* | 4/2020 | Yoon ..................... H04L 5/0041 |

FOREIGN PATENT DOCUMENTS

| CN | 103582152 A | 2/2014 |
| CN | 106993335 A | 7/2017 |
| CN | 107040953 A | 8/2017 |
| WO | 2017167243 A1 | 10/2017 |

OTHER PUBLICATIONS

Motorola Mobility ("Physical channel design for 2-step RACH"; 3GPP TSG RAN WG1 Meeting AH 1801; R1-1800727; Vancouver, Canada, Jan. 22-26, 2018) (Year: 2018).*

(Continued)

*Primary Examiner* — Melvin C Marcelo
*Assistant Examiner* — Natali Pascual Peguero
(74) *Attorney, Agent, or Firm* — Slater Matsil, LLP

(57) ABSTRACT

A method includes determining, based on a cyclic prefix (CP) length corresponding to a random access preamble and a time length corresponding to a cyclic shift interval, a CP length corresponding to a data channel, and sending the data channel. The method may be applied to a random access procedure.

19 Claims, 9 Drawing Sheets

(56) References Cited

OTHER PUBLICATIONS

Jasper Meynard Arana et al. ("Random-Access Technique for Self-Organization of 5G Millimeter-Wave Cellular Communications"; Hindawi Publishing Corporation; Mobile Information Systems; vol. 2016, Jan. 1, 2016 (Jan. 1, 2016), pp. 1-11) (Year: 2016).*
ETSI TS 101 475 ("Broadband Radio Access Networks (BRAN); HIPERLAN Type 2; Physical (PHY) layer"; V1.2.1 (Nov. 2000) (Year: 2000).*
Mediatek Inc., "On 2-step random access procedure and physical channel in NR", 3GPP TSG RAN WG1 Meeting #87, R1-1700172, Spokane, WA, US, Jan. 16-20, 2017, 7 pages.
Arana, J.M. et al., "Random-Access Technique for Self-Organization of 5G Millimeter-Wave Cellular Communications", Hindawi Publishing Corporation, vol. 2016, Article ID 5261089, Aug. 7, 2016, 12 pages.
Motorola Mobility, "Physical channel design for 2-step RACH", 3GPP TSG RAN WG1 Meeting AH 1801, R1-1800727, Vancouver, Canada, Jan. 22-26, 2018, 4 pages.
Interdigital Communications, "2-step random access procedure", 3GPP TSG RAN WG1 AH_NR Meeting, R1-1700703, Spokane, WA, USA, Jan. 16-20, 2017, 4 pages.
CATT, "Further considerations on a 2-step RA Procedure", 3GPP TSG RAN WG1 AH_NR Meeting, R1-1700186, Spokane, WA USA, Jan. 16-20, 2017, 4 pages.
CATT, "Further consideration on NR RACH preamble sequence and preamble format for capacity enhancement", 3GPP TSG RAN WG1 Meeting NR#3, R1-1715789, Nagoya, Japan, Sep. 18-21, 2017, 28 pages.
Ericsson, "NR two-step random access procedure", 3GPP TSG-RAN WG1 NR adhoc, R1-1700300, Spokane, WA, USA, Jan. 16-20, 2017, 4 pages.
3rd Generation Partnership Project; Technical Specification Group Radio Access Network; NR; Physical channels and modulation (Release 15) 3GPP TS 38.211 V15.1.0 (Mar. 2018), 90 pages.

* cited by examiner

DATA CHANNEL TRANSMISSION METHOD, DATA CHANNEL RECEIVING METHOD, AND APPARATUS

CROSS-REFERENCE TO RELATED APPLICATIONS

This application is a continuation of International Application No. PCT/CN2019/082778, filed on Apr. 15, 2019, which claims priority to Chinese Patent Application No. 201810350367.4, filed on Apr. 18, 2018. The disclosures of the aforementioned applications are hereby incorporated by reference in their entireties.

TECHNICAL FIELD

This application relates to the field of communications technologies, and in particular, to a data channel transmission method, a data channel receiving method, and an apparatus.

BACKGROUND

In a wireless communication process, user equipment (UE) may establish a connection to a base station (BS) through a random access procedure and implement uplink synchronization, so that the UE can send uplink data to the accessed BS. Currently, the UE may access the BS through a four-step random access procedure or a two-step random access procedure. The four-step random access procedure may be as follows: The UE sends a random access preamble, also referred to as a message 1 (Msg1), to the BS. After detecting the random access preamble, the BS sends a random access response, also referred to as a message 2 (Msg2), to the UE. The UE sends an uplink message, also referred to as a message 3 (Msg3), on an allocated uplink resource through a data channel (for example, a physical uplink shared channel (PUSCH)) according to an indication of the Msg 2. The Msg 3 carries information about a unique UE identification. Because a plurality of UEs may send a same random access preamble to the BS, the UEs receive a same Msg 2 and send Msgs 3 to the BS according to an indication of the Msg 2, resulting in a conflict between the plurality of Msgs 3. The BS can successfully receive a Msg 3 from a maximum of one UE at a time, or cannot successfully receive a Msg 3 from any UE due to interference between the UEs. To resolve the conflict, after successfully receiving one Msg 3, the BS returns a conflict resolution message (which may also be referred to as a Msg 4) to UE that successfully accesses the BS. The Msg 4 carries a unique identification in the Msg 3, to specify the UE that successfully accesses the BS. As shown in FIG. 1, a difference between the two-step random access procedure and the four-step random access procedure is that, in the two-step random access procedure, the Msg 1 sent by the UE to the BS includes the random access preamble and the data channel (for example, the PUSCH). In other words, the uplink data is sent before the uplink synchronization is completed, thereby reducing an uplink data transmission delay. In addition, compared with the four-step random access procedure, in the two-step random access procedure, the Msg 2 sent by the BS to the UE does not need to carry scheduling information of the data channel sent by the UE, thereby reducing signaling overheads. In embodiments of this application, the two-step random access procedure may also be referred to as two-step random access for short.

During the two-step random access, there may be a correspondence between the random access preamble and the data channel in the Msg 1, to facilitate detection by the BS. In a contention-based access scenario, information carried in the data channel may be used to indicate a UE identification, to facilitate the BS in determining an identity of the UE. The BS may pre-configure parameters (for example, a time-frequency resource position, a subcarrier spacing, a waveform, a reference signal, a modulation and coding scheme (MCS), power control, an extension sequence, and a signature sequence) related to data channel transmission. When receiving the Msg 1, the BS first detects the random access preamble. If the random access preamble is detected, a parameter such as a time-frequency resource position of the data channel is determined based on the correspondence between the random access preamble and the data channel. The BS demodulates data on the data channel at the determined time-frequency resource position. If the BS detects the random access preamble and successfully obtains, through demodulation, the data on the data channel corresponding to the random access preamble, the BS sends the Msg 2 in the two-step random access to the UE. After receiving the Msg 2, the UE determines that the data is successfully sent. The two-step random access may alternatively be rolled back to four-step random access. If the BS detects the random access preamble but fails to obtain, through demodulation, the data on the data channel, the BS may send the Msg 2 in the four-step random access procedure to the UE. After receiving the Msg 2, the UE performs the four-step random access. A key technology in the two-step random access procedure is to configure transmission parameters of the data channel in the Msg 1, including determining a cyclic prefix (CP) length of the data channel.

In the prior art, for example, in the four-step random access procedure, the data channel (for example, the PUSCH) may be sent in the Msg 3. Because there is a delay in signal propagation between the BS and the UE, there may be a relatively large time difference between signals from the plurality of UEs to the BS, resulting in the interference between the plurality of UEs. Therefore, to eliminate impact of the time difference, the BS may usually include a timing advance instruction in the Msg 2, and the UEs separately perform timing advance according to the received timing advance instruction, thereby avoiding the interference between the plurality of UEs. In the two-step random access procedure, the data channel (for example, the PUSCH) is sent in the Msg 1. In this case, the UE has not obtained the timing advance instruction. Therefore, the interference between the plurality of UEs may be avoided in two manners: Manner 1: Usually, the data channel and the random access preamble may have a same CP length, and may have a same subcarrier spacing or different subcarrier spacings. When the CP length of the random access preamble is greater than the time difference between the signals from the plurality of UEs to the BS, the interference between the plurality of UEs can be avoided. For example, a manner of multiplexing the data channel and the random access preamble may be a manner shown in FIG. 2, that is, the data channel and the random access preamble may be time-division multiplexed. For another example, a manner of multiplexing the data channel and the random access preamble may be a manner shown in FIG. 3, that is, the data channel and the random access preamble may be frequency-division multiplexed. Manner 2: As shown in FIG. 4, during the two-step random access, for the data channel in the Msg 1, the UE may use a frame structure and a CP length that are the same as those of another data channel (for example, the another data channel is an uplink data channel that is transmitted by the UE based on BS scheduling or a pre-configuration after the UE obtains timing adjustment information in the random access procedure). For example, when the data channel has a 15 kHz subcarrier spacing, the CP length is 4.7 μs. The BS first detects the random access preamble sent by the UE, to obtain a delay from the UE to the BS. Because for same UE, a delay of sending a random access preamble to the BS is the same as that of sending a data channel to the BS, the BS may determine a specific time-frequency resource position of the data channel in the Msg 1 based on the delay from the UE to the BS, and then demodulate the data on the data channel.

In Manner 1, CP overheads of the data channel in the Msg 1 are higher than that of the another data channel. For example, a CP length of the data channel in the Msg 1 is 3168 sampling intervals. When the data channel has the 15 kHz subcarrier spacing, each data part of an orthogonal frequency division multiplexing (OFDM) symbol corresponds to 2048 sampling intervals, and the CP overheads of the data channel in the Msg 1 account for up to 61%. However, CP overheads of common data account for only 6.6%. In Manner 2, to avoid the interference between the plurality of UEs, the UEs may send the data channel in the Msg 1 by using different time-frequency resources, resulting in high resource overheads.

SUMMARY

This application provides a data channel transmission method, a data channel receiving method, and an apparatus, to reduce signaling overheads and improve resource utilization.

To resolve the foregoing technical problem, this application provides the following technical solutions.

According to a first aspect, this application provides a data channel transmission method. The method includes: determining, based on a cyclic prefix CP length corresponding to a random access preamble and a time length corresponding to a cyclic shift interval, a CP length corresponding to a data channel; and sending the data channel.

This embodiment of this application provides the data channel transmission method. During two-step random access, the data channel is sent in a Msg 1. In this case, an apparatus that sends the Msg 1 does not obtain a timing advance instruction. To avoid interference between apparatuses that send the Msg 1, the CP length corresponding to the data channel needs to be increased. In this application, the CP length corresponding to the data channel is determined by using the cyclic prefix CP length corresponding to the random access preamble and the time length corresponding to the cyclic shift interval. Compared with the solution in the prior art, CP overheads corresponding to the data channel in a random access procedure can be reduced, thereby improving resource utilization.

In a possible design, the CP length corresponding to the data channel is greater than or equal to a smaller one of the CP length corresponding to the random access preamble and the time length corresponding to the cyclic shift interval. The CP length corresponding to the data channel is set to be greater than or equal to the smaller one of the CP length corresponding to the random access preamble and the time length corresponding to the cyclic shift interval. In this way, the interference between the apparatuses that send the Msg 1 can be avoided, and signaling overheads can be reduced.

In a possible design, the CP length corresponding to the data channel is a smallest one of one or more first CP lengths. Any one of the one or more first CP lengths is greater than or equal to the smaller one of the CP length corresponding to the random access preamble and the time length corresponding to the cyclic shift interval. In an actual process, the CP length corresponding to the data channel may occupy one or more slots. To better use time domain resources, in addition to meeting a limit of base station coverage, the CP length corresponding to the data channel further needs to be determined based on a parameter such as a quantity of slots. However, there are usually an integer quantity of OFDM symbols in one slot. The CP length corresponding to the data channel may be determined in one or more pre-configured first CP lengths, in order that the CP length corresponding to the data channel can satisfy a condition that there are an integer quantity of OFDM symbols in one slot. In addition, each of the one or more pre-configured first CP lengths corresponds to the integer quantity of OFDM symbols, thereby avoiding a waste of resources.

In a possible design, the CP length corresponding to the data channel is a CP length that corresponds to N repetitions of a data part of an orthogonal frequency division multiplexing OFDM symbol, and N is an integer greater than or equal to 2. To improve coverage performance, data may be repeatedly sent in one OFDM symbol. Compared with non-repeated data sending, during repeated data sending, a same quantity of OFDM symbols may correspond to different CP lengths and different data part lengths. In such a method for repeatedly sending data in one OFDM symbol, the CP overheads can be reduced while the coverage performance is improved. For the data channel, repeated data sending may be used to reduce overheads of the CP part.

According to a second aspect, this application provides a data channel receiving method. The method includes receiving a data channel, where a CP length corresponding to the data channel is determined based on a cyclic prefix CP length corresponding to a random access preamble and a time length corresponding to a cyclic shift interval.

In a possible design, the CP length corresponding to the data channel is greater than or equal to a smaller one of the CP length corresponding to the random access preamble and the time length corresponding to the cyclic shift interval.

In a possible design, the CP length corresponding to the data channel is a smallest one of one or more first CP lengths. Any one of the one or more first CP lengths is greater than or equal to the smaller one of the CP length corresponding to the random access preamble and the time length corresponding to the cyclic shift interval.

In a possible design, the CP length corresponding to the data channel is a CP length that corresponds to N repetitions of a data part of an orthogonal frequency division multiplexing OFDM symbol, and N is an integer greater than or equal to 2.

According to a third aspect, this application provides an apparatus. The apparatus may implement the method according to any one of the first aspect or the possible implementations of the first aspect, and therefore can achieve the beneficial effects in any one of the first aspect or the possible implementations of the first aspect. The apparatus may be a terminal, or may be an apparatus that supports a terminal in implementing the method according to any one of the first aspect or the possible implementations of the first aspect, for example, a chip system applied to the terminal. The apparatus may implement the foregoing method by using software or hardware, or by executing corresponding software by hardware.

In a possible design, the apparatus includes: a determining unit, configured to determine, based on a cyclic prefix CP length corresponding to a random access preamble and a time length corresponding to a cyclic shift interval, a CP length corresponding to a data channel; and a sending unit, configured to send the data channel.

Descriptions of the CP length corresponding to the data channel are the same as corresponding content in the first aspect. Details are not described herein again.

According to a fourth aspect, this application provides an apparatus. The apparatus may implement the method according to any one of the first aspect or the possible implementations of the first aspect. The apparatus may be a terminal, or may be an apparatus that can support a terminal in implementing the method according to any one of the first aspect or the possible implementations of the first aspect, for example, a chip system applied to the terminal. The apparatus may implement the foregoing method by using software or hardware, or by executing corresponding software by hardware.

In a possible design, the apparatus includes a processor and a communications interface. The processor is configured to determine, based on a cyclic prefix CP length corresponding to a random access preamble and a time length corresponding to a cyclic shift interval, a CP length corresponding to a data channel. The communications interface is configured to send the data channel.

Descriptions of the CP length corresponding to the data channel are the same as corresponding content in the first aspect. Details are not described herein again.

In a possible design, the communications interface provided in the fourth aspect is coupled to the processor.

In a possible design, the apparatus provided in the fourth aspect further includes a memory. The memory is configured to store code and data. At least one processor, the communications interface, and the memory are coupled to each other.

According to a fifth aspect, this application provides an apparatus. The apparatus may implement the method according to any one of the second aspect or the possible implementations of the second aspect, and therefore can achieve the beneficial effects in any one of the second aspect or the possible implementations of the second aspect. The apparatus may be a network device, or may be an apparatus that can support a network device in implementing the method according to any one of the second aspect or the possible implementations of the second aspect, for example, a chip system applied to the network device. The apparatus may implement the foregoing method by using software or hardware, or by executing corresponding software by hardware.

The apparatus includes a receiving unit, configured to receive a data channel, where a CP length corresponding to the data channel is determined based on a cyclic prefix CP length corresponding to a random access preamble and a time length corresponding to a cyclic shift interval.

Descriptions of the CP length corresponding to the data channel are the same as corresponding content in the second aspect. Details are not described herein again.

According to a sixth aspect, this application provides an apparatus. The apparatus includes a communications interface, configured to receive a data channel, where a CP length corresponding to the data channel is determined based on a cyclic prefix CP length corresponding to a random access preamble and a time length corresponding to a cyclic shift interval.

Descriptions of the CP length corresponding to the data channel are the same as corresponding content in the second aspect. Details are not described herein again.

According to a seventh aspect, this application provides a computer-readable storage medium. The computer-readable storage medium stores an instruction. When the instruction is run on a computer, the computer is enabled to perform one or more of the first aspect or the possible designs of the first aspect.

According to an eighth aspect, this application provides a computer-readable storage medium. The computer-readable storage medium stores an instruction. When the instruction is run on a computer, the computer is enabled to perform one or more of the second aspect or the possible designs of the second aspect.

According to a ninth aspect, this application provides a computer program product including an instruction. When the instruction is run on a computer, the computer is enabled to perform one or more of the first aspect or the possible designs of the first aspect.

According to a tenth aspect, this application provides a computer program product including an instruction. When the instruction is run on a computer, the computer is enabled to perform one or more of the second aspect or the possible designs of the second aspect.

According to an eleventh aspect, this application provides a chip system. The chip system includes a processor, and may further include a memory. The chip system is configured to implement one or more of the first aspect or the possible designs of the first aspect.

According to a twelfth aspect, this application provides a chip system. The chip system includes a processor, and may further include a memory. The chip system is configured to implement one or more of the second aspect or the possible designs of the second aspect.

According to a thirteenth aspect, this application further provides a communications system. The communications system includes the apparatus according to one or more of the third aspect or the possible designs of the third aspect and the apparatus according to one or more of the fifth aspect or the possible designs of the fifth aspect. Alternatively, the communications system includes the apparatus according to one or more of the fourth aspect or the possible designs of the fourth aspect and the apparatus according to one or more of the sixth aspect or the possible designs of the sixth aspect.

DETAILED DESCRIPTION OF ILLUSTRATIVE EMBODIMENTS

The term "and/or" in this application describes only an association relationship for describing associated objects and represents that three relationships may exist. For example, A and/or B may represent the following three cases: Only A exists, both A and B exist, and only B exists. In addition, the character "/" in this application generally indicates an "or" relationship between the associated objects.

It needs to be noted that, in this application, the word "exemplary" or "for example" is used to represent giving an example, an illustration, or a description. Any embodiment or design scheme described as an "exemplary" or "for example" in this application does not need to be explained as being more preferred or having more advantages than another embodiment or design scheme. Exactly, use of the word "exemplary" or "for example" or the like is intended to present a relative concept in a specific manner.

A network architecture and a service scenario described in embodiments of this application are intended to describe the technical solutions in the embodiments of this application more clearly, and do not constitute a limitation on the technical solutions provided in the embodiments of this application. A person of ordinary skill in the art may know that: With the evolution of the network architecture and the emergence of new service scenarios, the technical solutions provided in the embodiments of this application are also applicable to similar technical problems.

Figure 1:
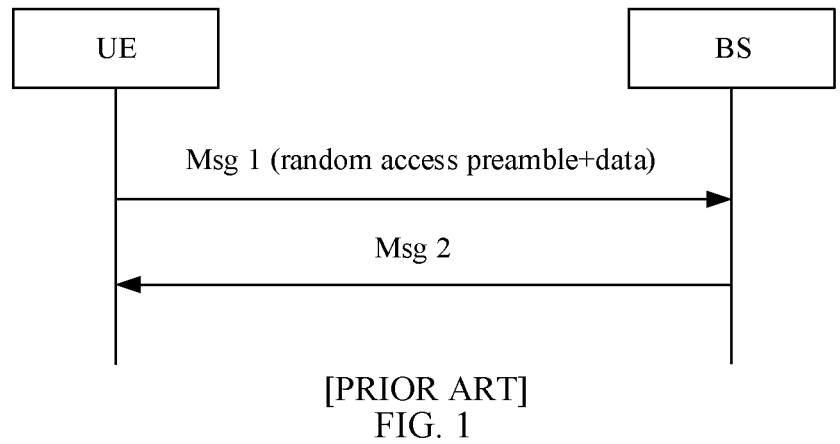
FIG. 1 is a schematic diagram of a random access procedure in the prior art.
Figure 2:
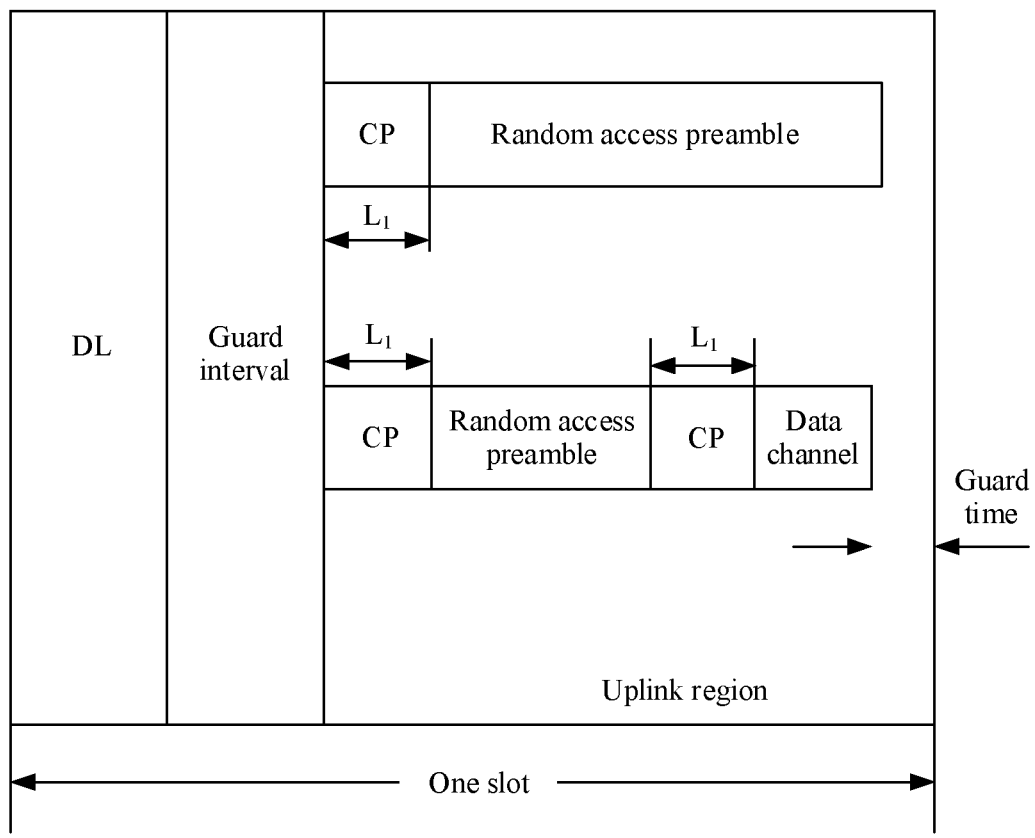
FIG. 2 is a schematic diagram of time-division multiplexing of data and a preamble sequence in the prior art.
Figure 3:
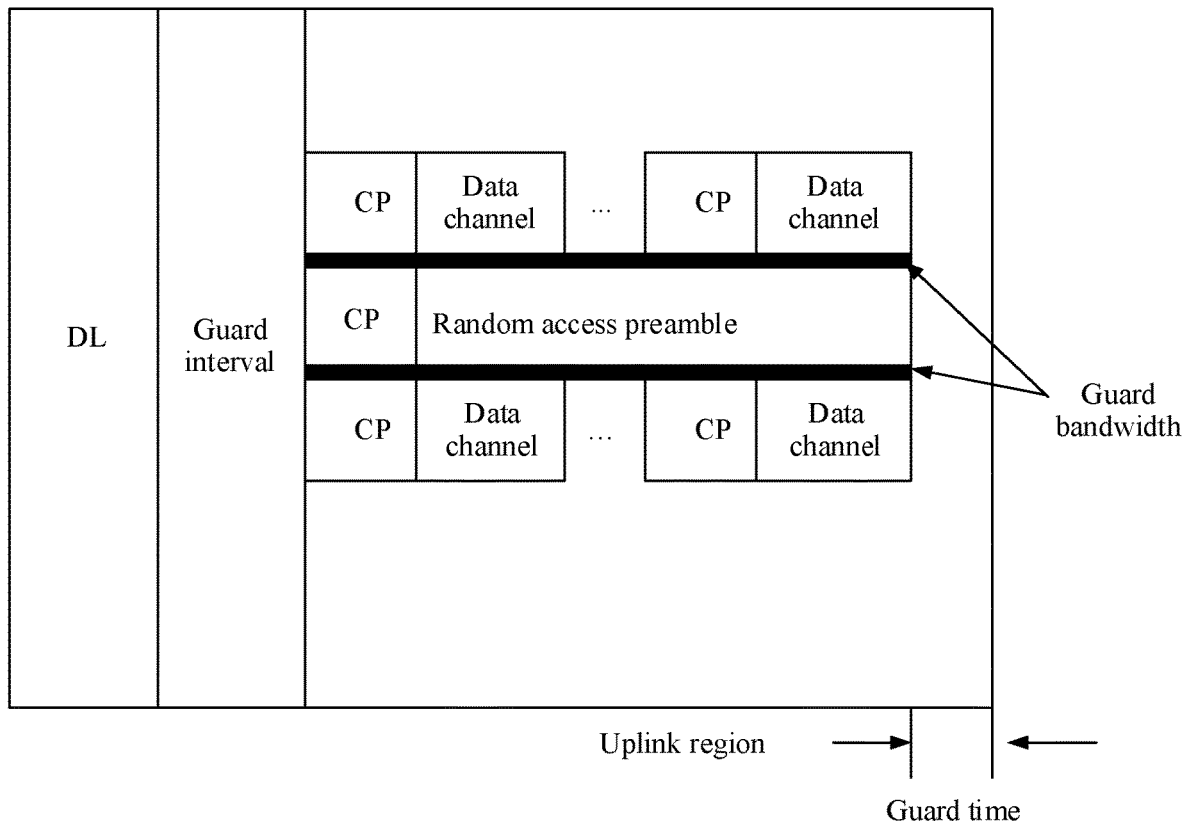
FIG. 3 is a schematic diagram of frequency-division multiplexing of data and a preamble sequence in the prior art.
Figure 4:
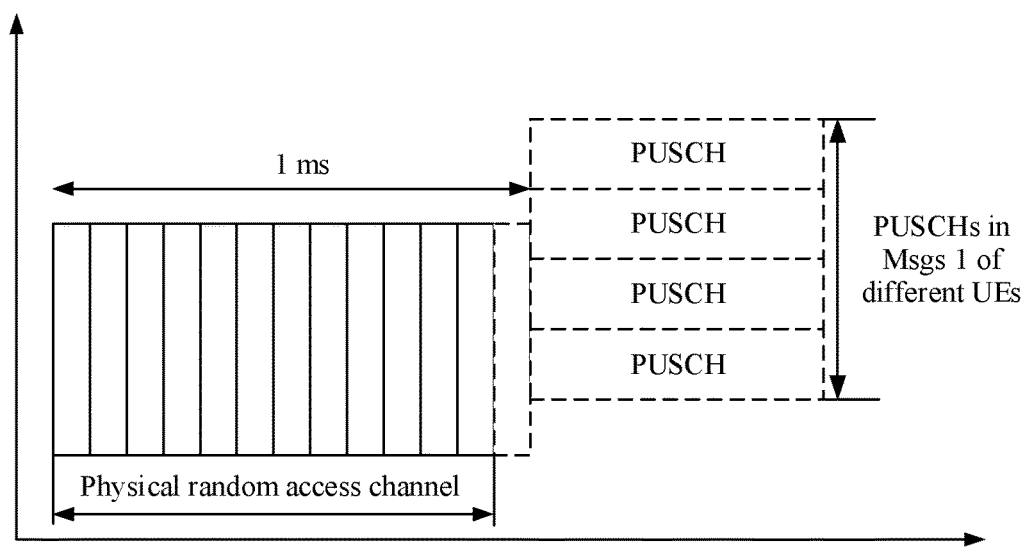
FIG. 4 is a schematic diagram of a frame structure during random access in the prior art.
Figure 5:
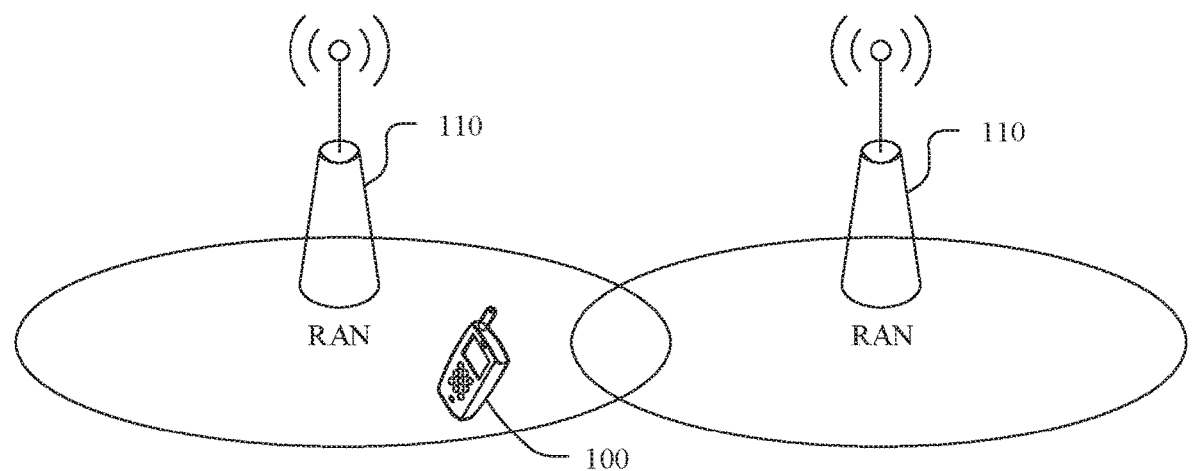
FIG. 5 is a schematic structural diagram of a communications system according to an embodiment of this application.

FIG. 5 is a schematic architectural diagram of a mobile communications system to which an embodiment of this application is applied. As shown in FIG. 5, the mobile communications system includes a terminal 100. The terminal 100 accesses a wireless network, to obtain a service from an external network (for example, the internet) over the wireless network or communicate with another terminal over the wireless network. The wireless network includes a radio access network (RAN) 110. The RAN 110 is configured to connect the terminal 100 to the wireless network. The RAN 110 may include a radio access network device.

The terminal is connected to the radio access network device in a wireless manner, and may access a core network through the radio access network device. The terminal 100 may be located at a fixed location, or may be mobile. FIG. 5 is merely a schematic diagram. The communications system may further include other network devices. For example, the communications system may further include a wireless relay device and a wireless backhaul device, which are not drawn in FIG. 5. Quantities of radio access network devices and terminals included in the mobile communications system are not limited in the embodiments of this application.

The radio access network device and the terminal may be deployed on land, including indoor or outdoor, or the radio access network device and the terminal may be handheld, or vehicle-mounted. Alternatively, the radio access network device and the terminal may be deployed on water, or may be deployed on an aircraft, a balloon and a satellite in the air. An application scenario of the radio access network device and the terminal is not limited in the embodiments of this application.

The terminal may also be referred to as user equipment (UE), an access terminal, a subscriber unit, a subscriber station, a mobile station, a mobile console, a remote station, a remote terminal, a mobile device, a user terminal, a terminal, a wireless communications device, a user agent, or a user apparatus. The terminal may be a station (STA) in a wireless local area network (WLAN), or may be a cellular phone, a cordless phone, a session initiation protocol (SIP) phone, a wireless local loop (WLL) station, a personal digital assistant (PDA) device, a handheld device having a wireless communication function, a computing device or another processing device connected to a wireless modem, a vehicle-mounted device, a wearable device, and a next-generation communications system, for example, a terminal in a 5th generation (5G) communications network or a terminal in a future evolved public land mobile network (PLMN). 5G may also be referred to as new radio (NR).

For example, in the embodiments of this application, the terminal may alternatively be a wearable device. The wearable device may also be referred to as a wearable intelligent device, and is a general term for wearable devices such as glasses, gloves, watches, clothes, and shoes that are developed by applying wearable technologies in intelligent designs of daily wear. The wearable device is a portable device that can be directly worn on a body or integrated into clothes or an accessory of a user. The wearable device is not merely a hardware device, but is used to implement a powerful function through software support, data exchange, and cloud interaction. Generalized wearable intelligent devices include full-featured and large-size devices that can implement complete or partial functions without depending on smartphones, for example, smart watches or smart glasses, and devices that focus on only one type of application function and need to work with other devices such as smartphones, for example, various smart bands or smart jewelry for monitoring physical signs.

The radio access network device may be an access device used by the terminal to access the mobile communications system in a wireless manner. For example, the radio access network device may be a network device. For example, the network device may be an access point (AP) in the WLAN, an evolved NodeB (eNB, or eNodeB) in long term evolution (LTE), or a base station (next generation Node B, gNB) in the NR. Alternatively, the network device may be a relay station or an access point, a vehicle-mounted device, a wearable device, a network device in a future 5G network, a network device in the future evolved PLMN network, or the like.

In addition, in the embodiments of this application, the network device provides a service for a cell, and the terminal communicates with the network device by using a transmission resource (for example, a frequency domain resource or a time-frequency resource) of the cell. The cell may be a cell corresponding to the network device (for example, a base station). The cell may belong to a macro base station, or may belong to a base station corresponding to a small cell. The small cell herein may include a metro cell, a micro cell, a pico cell, a femto cell, and the like. These small cells have small coverage and low transmit power, and are applicable to providing a high-rate data transmission service.

A data channel transmission method and an apparatus provided in the embodiments of this application can be applied to a terminal, and the terminal includes a hardware layer, an operating system layer running above the hardware layer, and an application layer running above the operating system layer. The hardware layer includes hardware such as a central processing unit (CPU), a memory management unit (MMU), and a memory (also referred to as a main memory). The operating system may be any one or more computer operating systems that implement service processing by using a process, for example, a Linux operating system, a Unix operating system, an Android operating system, an iOS operating system, or a windows operating system. The application layer includes applications such as a browser, an address book, text processing software, and instant messaging software. In addition, in the embodiments of this application, a specific structure of an execution body of the data channel transmission method is not particularly limited in the embodiments of this application, provided that the data channel transmission method in the embodiments of this application can be implemented.

In addition, aspects or features in the embodiments of this application may be implemented as a method, an apparatus or a product that uses standard programming and/or engineering technologies. The term "product" used in this application covers a computer program that can be accessed from any computer-readable component, carrier or medium. For example, a computer-readable medium may include but is not limited to a magnetic storage component (for example, a hard disk, a floppy disk, or a magnetic tape), an optical disc (for example, a compact disc (CD), a digital versatile disc (DVD)), a smart card and a flash memory component (for example, an erasable programmable read-only memory (EPROM), a card, a stick, or a key drive). In addition, various storage media described in this specification may indicate one or more devices and/or other machine-readable media that are configured to store information. The term "machine-readable media" may include but is not limited to a radio channel, and various other media that can store, include, and/or carry an instruction and/or data.

It may be understood that, in this application, the data channel transmission method may be performed by a terminal, or an apparatus that supports the terminal in implementing the method, for example, an apparatus applied to the terminal, for example, a chip system; and a data channel receiving method may be performed by a network device, or an apparatus that supports the network device in implementing the method, for example, an apparatus applied to the network device, for example, a chip system. In the following embodiments, an example in which a data channel transmission method is performed by a terminal and a data channel receiving method is performed by a network device is used.

Figure 6:
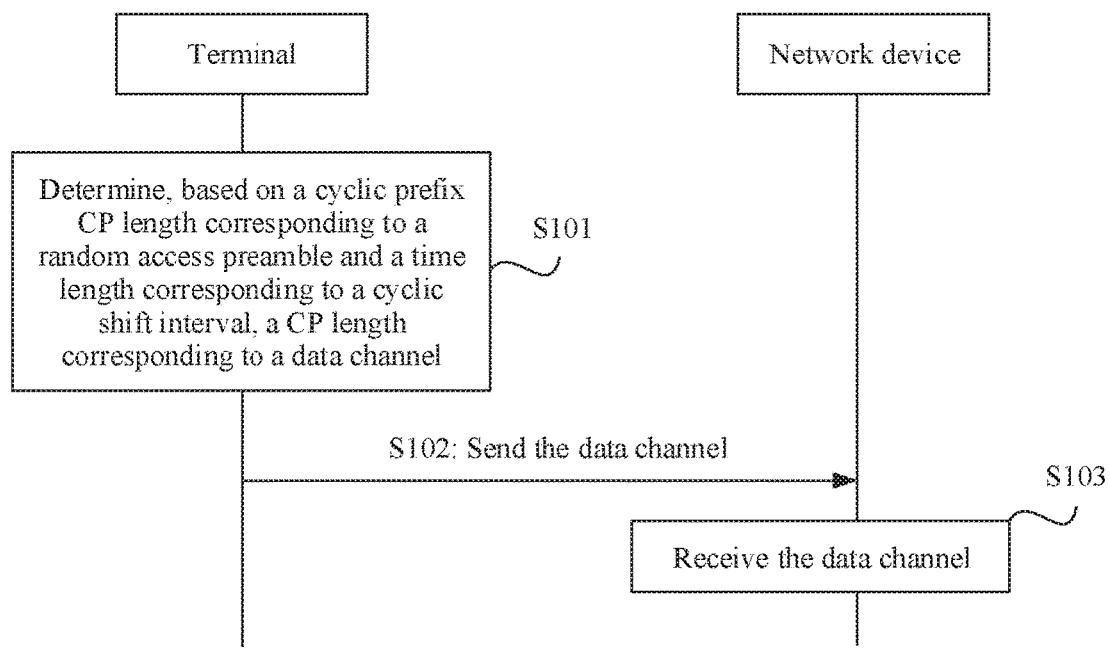
FIG. 6 is a schematic flowchart of a communication method according to an embodiment of this application.

FIG. 6 shows a data channel transmission and reception method according to this application. The method includes the following steps.

S101: A terminal determines, based on a cyclic prefix CP length corresponding to a random access preamble and a time length corresponding to a cyclic shift interval, a CP length corresponding to a data channel and/or a control channel. The following embodiments are described by using the data channel as an example.

For example, in the embodiments of this application, the data channel may be a physical uplink shared channel (PUSCH), and the control channel may be a physical uplink control channel. In the embodiments of this application, the data channel may be used to carry data.

It may be understood that, in the embodiments of this application, the cyclic prefix CP length corresponding to the random access preamble may be understood as a length of a cyclic prefix of an OFDM symbol used to transmit the random access preamble.

S102: The terminal sends the data channel to a network device.

Optionally, when the terminal needs to access the network device through a random access procedure, in step S102 in this application, the terminal may further send the random access preamble to the network device.

S103: The network device receives the data channel sent by the terminal. The CP length corresponding to the data channel is determined based on the cyclic prefix CP length corresponding to the random access preamble and the time length corresponding to the cyclic shift interval.

Optionally, when the terminal further sends the random access preamble to the network device, in step S103 in this application, the network device further needs to receive the random access preamble.

The data channel transmission method provided in the embodiments of this application may be applied to a two-step random access scenario. In addition to being applied to a Msg 1 in the two-step random access scenario, the solutions of this application may be further applied to another scenario in which a data channel is sent when timing synchronization is not implemented.

During two-step random access, the data channel is sent in the Msg 1. In this case, an apparatus that sends the Msg 1 does not obtain a timing advance instruction. To avoid interference between apparatuses that send the Msg 1, the CP length corresponding to the data channel may be increased. In the embodiments of this application, the CP length corresponding to the data channel is determined by using the cyclic prefix CP length corresponding to the random access preamble and the time length corresponding to the cyclic shift interval. Compared with the solution in the prior art, CP overheads corresponding to the data channel in the random access procedure can be reduced, thereby improving resource utilization.

Optionally, in another embodiment of this application, after step S103, the method may further include: demodulating, by the network device, the data channel at a time-frequency resource position of the data channel based on an association relationship between the data channel and the random access preamble. It needs to be noted that, before step S103, the association relationship between the data channel and the random access preamble exists in the network device.

Figure 7:
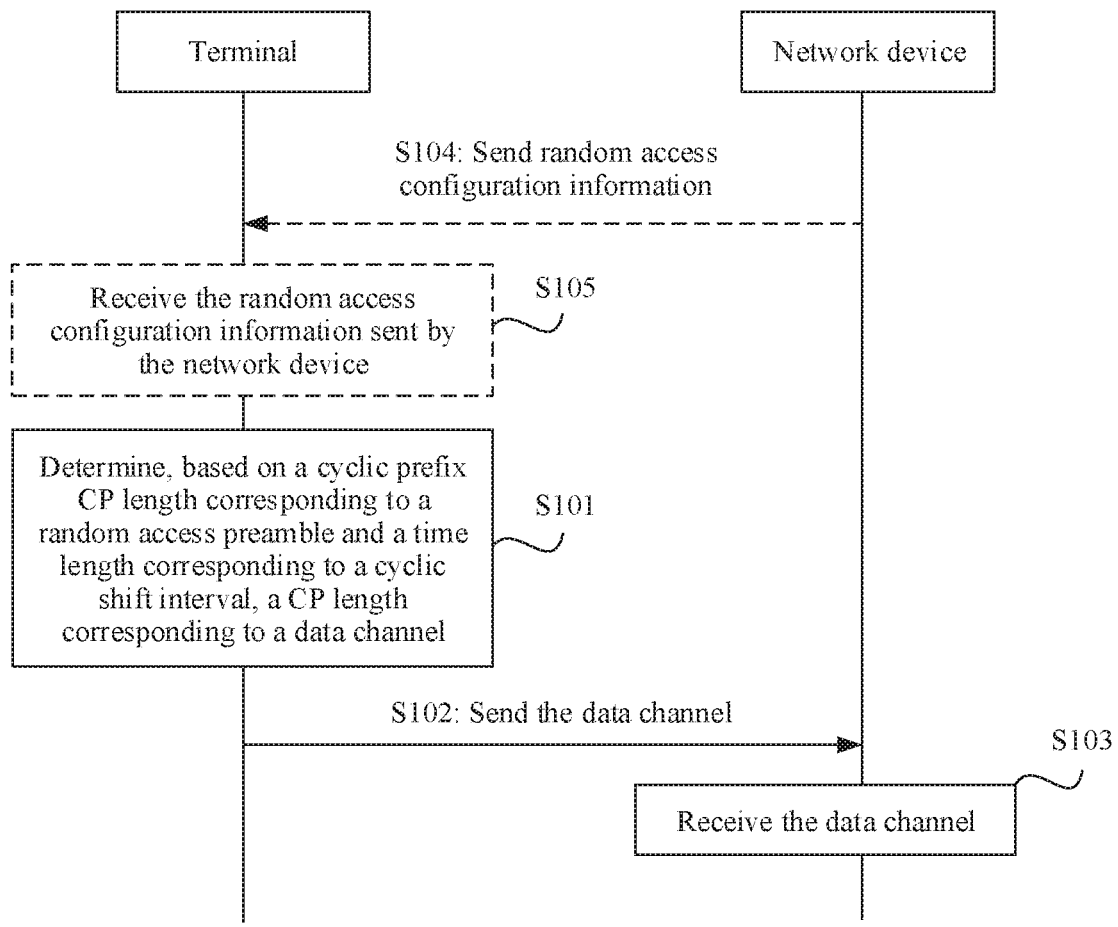
FIG. 7 is a schematic flowchart of another communication method according to an embodiment of this application.

In an embodiment of this application, as shown in FIG. 7, the method provided in the embodiments of this application further includes the following steps.

S104: The network device sends random access configuration information to the terminal. The random access configuration information includes random access preamble configuration information and zero-correlation zone configuration information (which may also be referred to as cyclic shift configuration information). S105: The terminal receives the random access configuration information sent by the network device.

Specifically, the random access configuration information may be sent by the network device to the terminal by using a system message.

In a possible implementation of the embodiments of this application, in the methods provided in the embodiments of this application, step S101 in the embodiments of this application may be implemented in the following manner.

S101: The terminal determines, based on the random access preamble configuration information, a CP length associated with the random access preamble configuration information as the CP length corresponding to the random access preamble.

In an example, the random access preamble configuration information may include a random access preamble format.

It may be understood that the random access preamble includes a cyclic prefix and a preamble sequence. The method provided in the embodiments of this application further includes: obtaining, by the terminal, a random access preamble configuration information set, where the random access preamble configuration information set includes at least one piece of random access preamble configuration information, and a CP length and a preamble sequence length that are associated with each of the at least one piece of random access preamble configuration information; and storing, by the terminal, the at least one piece of random access preamble configuration information, and the CP length and the preamble sequence length that are associated with each of the at least one piece of random access preamble configuration information. For example, the terminal may obtain the random access preamble configuration information in the following manner. The terminal receives the random access preamble configuration information sent by the network device. Alternatively, the terminal obtains the random access preamble configuration information from pre-configuration information. For example, as shown in Table 1, in the following embodiment, an example in which the random access preamble configuration information is the random access preamble format is used.

TABLE 1

Random access preamble configuration information set

| Random access preamble format | Preamble sequence length $L_{ra}$ | Subcarrier spacing $\Delta f^{RA}$ | Quantity $N_u$ of sampling points corresponding to a preamble sequence | Quantity $N_{CP}^{RA}$ of sampling points corresponding to a cyclic prefix |
|---|---|---|---|---|
| 0 | 839 | 1.25 kHz | 24576κ | 3168κ |
| 1 | 839 | 1.25 kHz | 2 · 24576κ | 21024κ |
| 2 | 839 | 1.25 kHz | 4 · 24576κ | 4688κ |
| 3 | 839 | 5 kHz | 4 · 6144κ | 3168κ |

$L_{RA}$ is the preamble sequence length, $\Delta f^{RA}$ is the subcarrier spacing, $N_u$ is the quantity of sampling points corresponding to the preamble sequence, and $N_{CP}^{RA}$ is the quantity of sampling points corresponding to the cyclic prefix. In an NR system, a maximum subcarrier spacing is $\Delta f_{max} \cdot 10^3$ Hz, a maximum quantity of fast fourier transform (FFT) points is $N_f = 4096$, and a corresponding minimum sampling interval is $T_c = 1/(\Delta f_{max} \cdot N_f)$, where a unit is second. In a common frame structure configuration, a subcarrier spacing is $\Delta f_{ref} = 15 \cdot 10^3$ Hz, a quantity of FFT points is $N_{f,ref} = 2048$, and a sampling interval is $T_s = 1/(\Delta f_{ref} \cdot f_{ref})$, where a unit is second. A constant $k = T_s/T_c = 64$ indicates a ratio of the two sampling intervals. After the sampling interval is given, the time length is in one-to-one correspondence with the quantity of sampling points. For example, according to the preamble format 0, the quantity of sampling points corresponding to the preamble sequence is 24576k. When the subcarrier spacing is $15 \cdot 10^3$ Hz and the quantity of FFT points is 2048, the quantity of sampling points is 24576 and the corresponding time length is $T_{RA} = 24576 T_s$. When the subcarrier spacing is $480 \cdot 10^3$ KHz and the quantity of FFT points is 4096, the quantity of sampling points is 24576k and the corresponding time length is $T_{RA} = 24576k T_c$.

In a network deployment phase, the network device may determine a random access preamble configuration parameter based on cell coverage. The terminal may determine the cell coverage based on the random access preamble configuration information sent by the network device. To ensure that no random access preamble sent by another terminal is interfered with by the random access preamble sent by the terminal, the CP length of the random access preamble sent by the terminal needs to satisfy: $T_{CP} \geq 2D/c + s$, where D represents coverage of a cell accessed by the terminal, c represents a speed of light, and s represents a channel delay spread.

S1012: The terminal determines, based on the cyclic shift configuration information, the time length corresponding to the cyclic shift interval.

For example, the cyclic shift configuration information may be a cyclic shift configuration number, or may be a zero-correlation zone configuration number. The cyclic shift configuration information is used to determine the cyclic shift interval.

For example, step S1012 in the embodiments of this application may be implemented in the following manner. The terminal determines, based on the cyclic shift configuration information, the cyclic shift interval corresponding to the cyclic shift configuration information. The terminal determines, based on the random access preamble configuration information, the preamble sequence length associated with random access preamble configuration information and the time length corresponding to the preamble sequence. The terminal determines the time length corresponding to the cyclic shift interval, based on the cyclic shift interval, the preamble sequence length, and the time length corresponding to the preamble sequence. The time length corresponding to the preamble sequence may also be referred to as the quantity of sampling points corresponding to the preamble sequence.

For example, Table 2 shows cyclic shift configuration information. Different zero-correlation zone configuration numbers correspond to different cyclic shift interval values $N_{CS}$. According to a random access preamble format, the determining, by the terminal, the time length corresponding to the cyclic shift interval, based on the cyclic shift interval, the preamble sequence length, and the time length corresponding to the preamble sequence includes: determining, by the terminal, the time length corresponding to the cyclic shift interval according to the following formula:

$$T_{CS} = \frac{N_{CS}}{L_{RA}} T_{RA},$$

where $T_{CS}$ represents the time length corresponding to the cyclic shift interval, $T_{RA}$ represents the time length corresponding to the preamble sequence, $N_{CS}$ represents the cyclic shift interval, and $L_{RA}$ represents the preamble sequence length.

TABLE 2

Cyclic shift configuration information

| Zero-correlation zone configuration number zeroCorrelationZoneConfig | Cyclic shift interval value $N_{CS}$ |
|---|---|
| 0 | 0 |
| 1 | 13 |
| 2 | 15 |
| 3 | 18 |
| 4 | 22 |
| 5 | 26 |
| 6 | 32 |
| 7 | 38 |
| 8 | 46 |
| 9 | 59 |
| 10 | 76 |
| 11 | 93 |
| 12 | 119 |
| 13 | 167 |
| 14 | 279 |
| 15 | 419 |

In a possible implementation, the network device may indicate a currently used cyclic shift interval. For example, the network device configures the zero-correlation zone configuration information (zeroCorrelationZoneConfig) for the terminal by using a radio resource control (RRC) message, to indicate the currently used cyclic shift interval.

After the cyclic shift interval is configured, to avoid false detection caused by interference between the terminals, the CP length $T_{CP}$ corresponding to the random access preamble and the time length $T_{CS}$ corresponding to the cyclic shift interval may satisfy the following condition: min f($T_{CP}$, $T_{CS}$)≥2D/c+s, to be specific, a smaller one of $T_{CP}$ and $T_{CS}$ may be greater than or equal to 2D/c+s.

S1013: The terminal determines a smaller one of the time length corresponding to the cyclic shift interval and the CP length corresponding to the random access preamble as the CP length corresponding to the data channel.

In other words, in this embodiment of this application, the CP length corresponding to the data channel may be equal to the smaller one of the CP length corresponding to the random access preamble and the time length corresponding to the cyclic shift interval.

The following uses an example in which the CP length corresponding to the random access preamble format 0 in the NR system is $T_{CP}$=3168$T_s$, and the corresponding subcarrier spacing is 1.25 KHz, that is, $T_{RA}$=24576$T_s$.

Figure 8:
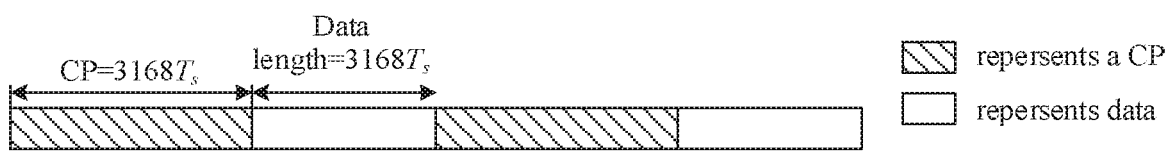
FIG. 8 is a schematic diagram 1 of a CP length corresponding to a data channel in different random access configurations.

For example, as shown in FIG. 8, if the cyclic shift interval is 279, the preamble sequence length is 839, and the time length corresponding to the preamble sequence is 24576$T_s$, the time length corresponding to the cyclic shift interval is $$T_{CS} = \left\lceil \frac{279}{839} * 24576 \right\rceil T_s = 8173 T_s,$$

where ⌈•⌉ represents rounding up. The terminal uses the smaller one of $T_{CP}$ and $T_{CS}$ as the CP length corresponding to the data channel, that is, the CP length corresponding to the data channel is 3168$T_s$.

Figure 9:
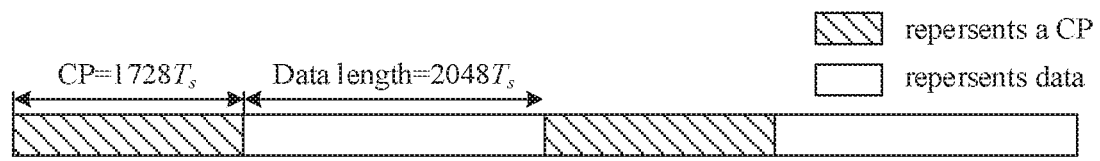
FIG. 9 is a schematic diagram 2 of a CP length corresponding to a data channel in different random access configurations.

If the data channel has a 15 kHz subcarrier spacing, and a length of a data part is 2048$T_s$, the CP overheads account for up to 60.7%. For example, as shown in FIG. 9, if the cyclic shift interval is 59, the preamble sequence length is 839, and the time length corresponding to the preamble sequence is 24576$T_s$, the time length corresponding to the cyclic shift interval is $$T_{CS} = \left\lceil \frac{59}{839} * 24576 \right\rceil T_s = 1278 T_s.$$

The terminal uses the smaller one of $T_{CP}$ and $T_{CS}$ as the CP length corresponding to the data channel. To be specific, the terminal determines that the CP length corresponding to the data channel is 1728 $T_s$, so that the CP overheads account for 45.8%.

Figure 10:
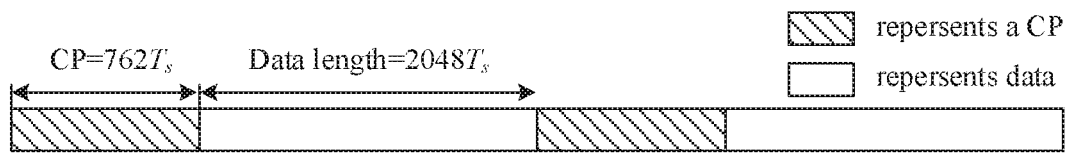
FIG. 10 is a schematic diagram 3 of a CP length corresponding to a data channel in different random access configurations.

For example, as shown in FIG. 10, if the cyclic shift interval is 26, the preamble sequence length is 839, and the time length corresponding to the preamble sequence is 24576$T_s$, the time length corresponding to the cyclic shift interval is $$T_{CS} = \left\lceil \frac{26}{839} * 24576 \right\rceil T_s = 762 T_s.$$

The terminal uses the smaller one of $T_{CP}$ and $T_{CS}$ as the CP length corresponding to the data channel. To be specific, the terminal determines that the CP length corresponding to the data channel is 762$T_s$, so that the CP overheads account for 27.1%.

Figure 11:
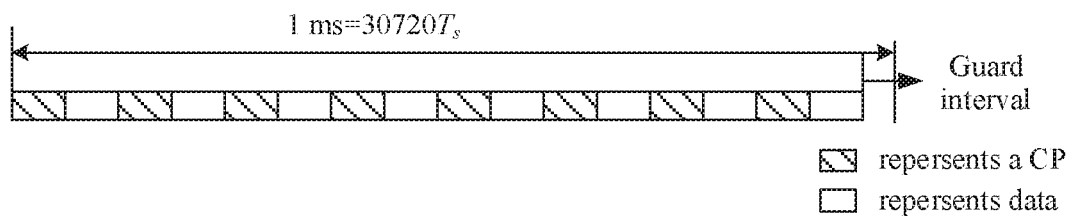
FIG. 11 is a schematic diagram of a frame format corresponding to a data channel according to an embodiment of this application.

Compared with the preamble sequence, the data channel corresponds to a smaller CP length and has a larger subcarrier spacing. Therefore, compared with the preamble sequence, more OFDM symbols may be transmitted on the data channel in a same time length. As shown in FIG. 11, after the method provided in the embodiments of this application is used, eight OFDM symbols may be used to transmit data in the Msg 1 within 1 ms. However, before the method provided in this application is used, only five OFDM symbols can be used to transmit the data in the Msg 1 within 1 ms. Similar to the preamble sequence, for the data channel, a particular guard interval also needs to be reserved, to reduce impact on subsequent transmission.

Figure 12:
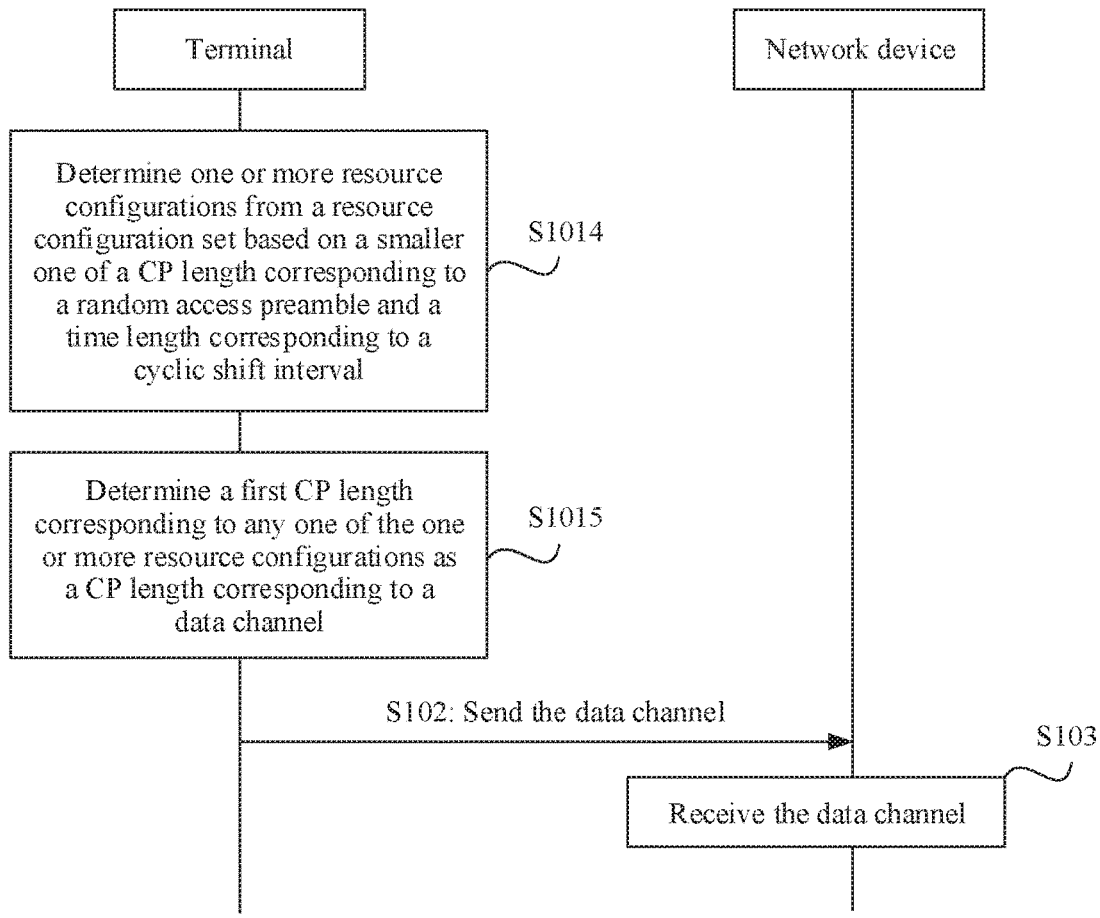
FIG. 12 is a schematic flowchart of still another communication method according to an embodiment of this application.

Because there are usually an integer quantity of OFDM symbols in one slot, in the foregoing embodiment, if the smaller one of the time length corresponding to the cyclic shift interval and the CP length corresponding to the random access preamble is determined as the CP length corresponding to the data channel, the CP length corresponding to the data channel may not satisfy a condition that there are an integer quantity of OFDM symbols in one slot, resulting in a waste of resources. In the method provided in the embodiments of this application, to further reduce the waste of resources, as shown in FIG. 12, step S101 may be implemented in the following manner.

S1014: The terminal determines one or more resource configurations from a resource configuration set based on the smaller one of the CP length corresponding to the random access preamble and the time length corresponding to the cyclic shift interval. A CP length corresponding to any one of the one or more resource configurations is greater than or equal to the smaller one of the CP length corresponding to the random access preamble and the time length corresponding to the cyclic shift interval.

Optionally, before the terminal randomly accesses the network device, the resource configuration set exists in the terminal. In an example, the resource configuration set may be configured by the network device for the terminal. In another example, the resource configuration set may be pre-configured. The resource configuration set includes at least one resource configuration, and the resource configuration is used to determine the CP length corresponding to the data channel. In other words, one resource configuration corresponds to one first CP length. Different resource configurations may correspond to a same first CP length, or may correspond to different first CP lengths. This is not limited in the embodiments of this application. The resource configuration may include a first CP length corresponding to an OFDM symbol and a quantity of OFDM symbols. A larger first CP length indicates a smaller quantity of OFDM symbols in a time unit. The time unit may be a common time unit in the art, such as a subframe, a slot, a mini-slot, a transmission time interval (TTI), or a frame.

Specifically, in the embodiments of this application, after determining the CP length corresponding to the random access preamble and the time length corresponding to the cyclic shift interval, the terminal determines the one or more resource configurations from the resource configuration set based on the smaller one of the CP length corresponding to the random access preamble and the time length corresponding to the cyclic shift interval.

S1015: The terminal determines a first CP length corresponding to one of the one or more resource configurations as the CP length corresponding to the data channel.

It needs to be noted that, in step S1015, the terminal may determine a first CP length corresponding to any one of the one or more resource configurations as the CP length corresponding to the data channel. To avoid the waste of resources, the terminal may further determine a smallest one of one or more first CP lengths as the CP length corresponding to the data channel. Any one of the one or more first CP lengths is greater than or equal to the smaller one of the CP length corresponding to the random access preamble and the time length corresponding to the cyclic shift interval.

For example, Table 3 lists a plurality of resource configurations when the time length of the data channel is 1 ms and the subcarrier spacing is 15 kHz. FIG. 9 is used as an example. When the cyclic shift interval is 59, the preamble sequence length is 839, and the time length corresponding to the preamble sequence is $24576T_s$, the time length corresponding to the cyclic shift interval is $$T_{CS} = \left\lceil \frac{59}{839} * 24576 \right\rceil T_s = 1728 T_s.$$

Because $T_{CP}=3168T_s$ is greater than $T_{CS}=1728T_s$, the CP length corresponding to the data channel is a smaller one of $T_{CP}$ and $T_{CS}$, that is, $1728T_s$.

TABLE 3

Resource configuration when a time length of a data channel is 1 ms and a subcarrier spacing is 15 kHz

| Configuration index | Quantity of OFDM Symbols | $T_{CP}$ | $T_{OS}$ (a time length corresponding to an OFDM symbol) |
|---|---|---|---|
| 0 | 1 | 14408 $T_s$ | 2048 $T_s$ |
| 1 | 2 | 8923 $T_s$ | 2048 $T_s$ |
| 2 | 3 | 6180 $T_s$ | 2048 $T_s$ |
| 3 | 4 | 4534 $T_s$ | 2048 $T_s$ |
| 4 | 5 | 3438 $T_s$ | 2048 $T_s$ |
| 5 | 6 | 2654 $T_s$ | 2048 $T_s$ |
| 6 | 7 | 2066 $T_s$ | 2048 $T_s$ |
| 7 | 8 | 1609 $T_s$ | 2048 $T_s$ |
| 8 | 9 | 1243 $T_s$ | 2048 $T_s$ |
| 9 | 10 | 944 $T_s$ | 2048 $T_s$ |
| 10 | 11 | 695 $T_s$ | 2048 $T_s$ |
| 11 | 12 | 484 $T_s$ | 2048 $T_s$ |

With reference to Table 3, it can be learned that CP lengths associated with the resource configurations numbered 0 to 6 are all greater than $1728T_s$. Therefore, the terminal can select a CP length corresponding to any one of the resource configurations numbered 0 to 6 as the CP length corresponding to the data channel, thereby meeting a requirement.

However, to further reduce the waste of resources and improve the resource utilization, in this application, the terminal may select, from the resource configurations numbered 0 to 6, a resource configuration with a smallest CP length, that is, the resource configuration numbered in Table 3. In other words, the quantity of OFDM symbols is 7, and the CP length is $2066T_s$. Therefore, the terminal determines that the CP length corresponding to the data channel is $2066T_s$.

Table 4 shows at least one resource configuration when the time length of the data channel is 2 ms and the subcarrier spacing is 15 kHz. Correspondingly, the terminal may determine a CP length actually used for the data channel, based on the smaller one of the CP length corresponding to the random access preamble and the time length corresponding to the cyclic shift interval and a resource configuration corresponding to the smaller one.

TABLE 4

Resource configuration when a time length of a data channel is 2 ms and a subcarrier spacing is 15 kHz

| Configuration index | Quantity of OFDM Symbols | $T_{CP}$ | $T_{OS}$ |
|---|---|---|---|
| 0 | 2 | 19463 $T_s$ | 2048 $T_s$ |
| 1 | 3 | 13860 $T_s$ | 2048 $T_s$ |
| 2 | 4 | 10678 $T_s$ | 2048 $T_s$ |
| 3 | 5 | 8557 $T_s$ | 2048 $T_s$ |
| 4 | 6 | 7042 $T_s$ | 2048 $T_s$ |
| 5 | 7 | 5906 $T_s$ | 2048 $T_s$ |
| 6 | 8 | 5022 $T_s$ | 2048 $T_s$ |
| 7 | 9 | 4315 $T_s$ | 2048 $T_s$ |
| 8 | 10 | 3737 $T_s$ | 2048 $T_s$ |
| 9 | 12 | 2847 $T_s$ | 2048 $T_s$ |
| 10 | 14 | 2194 $T_s$ | 2048 $T_s$ |
| 11 | 16 | 1695 $T_s$ | 2048 $T_s$ |
| 12 | 18 | 1301 $T_s$ | 2048 $T_s$ |
| 13 | 20 | 982 $T_s$ | 2048 $T_s$ |
| 14 | 22 | 718 $T_s$ | 2048 $T_s$ |
| 15 | 24 | 497 $T_s$ | 2048 $T_s$ |

For example, in Table 4, CP lengths associated with the resource configurations numbered 0 to 10 are all greater than $1728T_s$. Therefore, the terminal can select $T_{CP}$ associated with any one of the resource configurations numbered 0 to 10 as the CP length corresponding to the data channel. For example, the terminal may determine that the CP length corresponding to the data channel is $3737T_s$, or may determine that the CP length corresponding to the data channel is $13860T_s$. However, to further reduce the waste of resources, in this application, the terminal may determine a smallest one of the CP lengths associated with the resource configurations numbered 0 to 10 as the CP length corresponding to the data channel. For example, the terminal may determine that the CP length corresponding to the data channel is $2194T_s$.

For example, Table 5 shows a resource configuration when the time length of the data channel is 1 ms, the subcarrier spacing is 15 kHz, and a quantity of repetitions of a data part of the OFDM symbol is 2.

TABLE 5

Resource configuration when a time length of a data channel is 1 ms, a subcarrier spacing is 15 kHz, and a quantity of repetitions of a data part of an OFDM symbol is 2

| Configuration index | Quantity of OFDM Symbols | $T_{CP}$ | $T_{OS}$ |
|---|---|---|---|
| 0 | 1 | $13384\ T_s$ | $2*2048\ T_s$ |
| 1 | 2 | $7557\ T_s$ | $2*2048\ T_s$ |
| 2 | 3 | $4644\ T_s$ | $2*2048\ T_s$ |
| 3 | 4 | $2896\ T_s$ | $2*2048\ T_s$ |
| 4 | 5 | $1730\ T_s$ | $2*2048\ T_s$ |
| 5 | 6 | $898\ T_s$ | $2*2048\ T_s$ |
| 6 | 7 | $274\ T_s$ | $2*2048\ T_s$ |

It can be learned by comparing Table 3, Table 4, and Table 5 that a same quantity of OFDM symbols may correspond to different CP lengths and different data part lengths.

Figure 13:
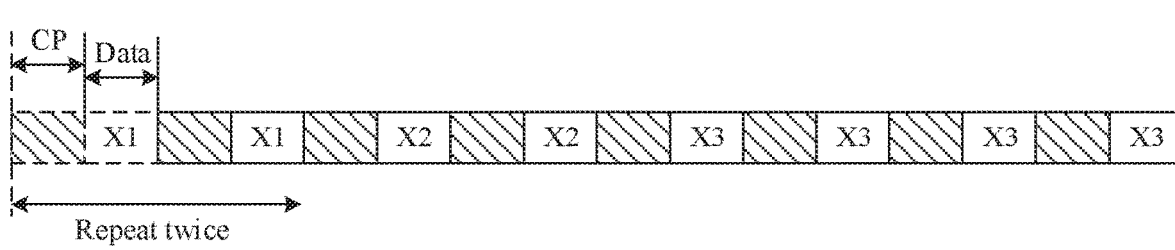
FIG. 13 is a schematic diagram of a repeated sending manner used for an OFDM symbol according to an embodiment of this application.
Figure 14:
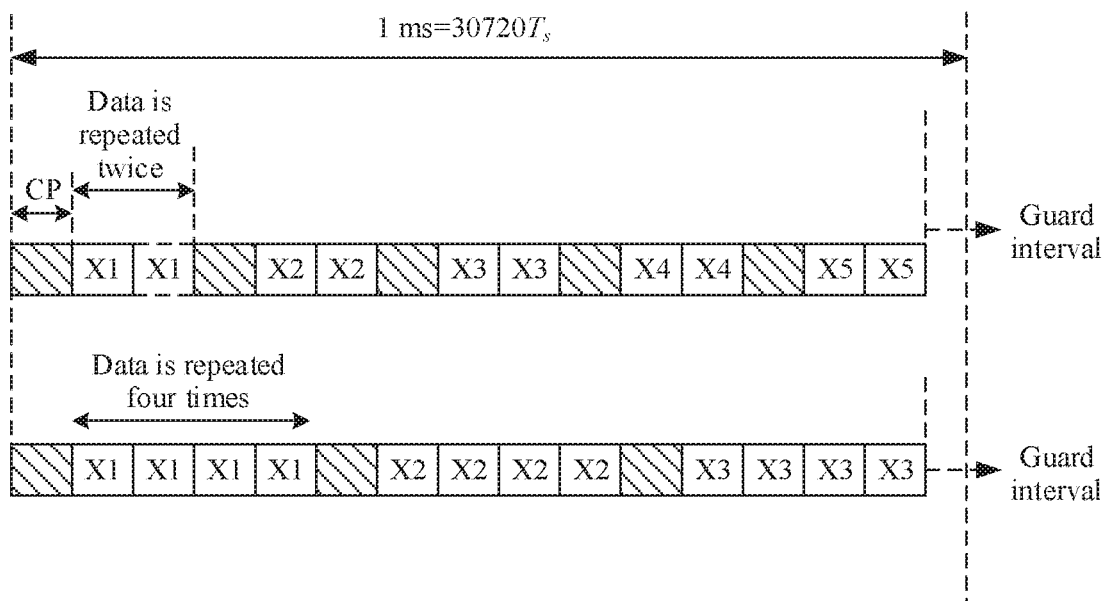
FIG. 14 is a schematic diagram of a repeated sending manner used for an OFDM symbol according to an embodiment of this application.

In some scenarios, repeated sending may be performed to improve coverage performance. An implementation is shown in FIG. 13. In FIG. 13, X1, X2, and X3 respectively represent different data, and a CP part and a data part (which may be understood as a part carrying data) of each OFDM symbol are repeatedly sent twice. A repeated sending method used in this embodiment is shown in FIG. 14. A data part of each OFDM symbol is repeatedly sent twice or four times. According to the repeated sending method, the CP overheads can be reduced while the coverage performance is improved. For the data channel, repeated sending may be used to reduce overheads of the CP part. Therefore, the CP length in each method provided the embodiments of this application, for example, the CP length corresponding to any one of the one or more resource configurations in the embodiments of this application, is a CP length that corresponds to N repetitions of the data part of the OFDM symbol, and N is an integer greater than or equal to 2. Alternatively, in the embodiments of this application, the CP length corresponding to the data channel is a CP length that corresponds to N repetitions of the data part of the OFDM symbol.

The foregoing mainly describes the solutions provided in the embodiments of this application from a perspective of interaction between network elements. It may be understood that, to implement the foregoing function, the network elements, such as the terminal and the network device, include a corresponding hardware structure and/or software module for performing each function. A person skilled in the art needs to easily be aware that, in combination with units and algorithm steps of the examples described in the embodiments disclosed in this specification, this application may be implemented by hardware, software, or a combination of hardware and computer software. Whether a function is performed by hardware or hardware driven by computer software depends on particular applications and design constraints of the technical solutions. A person skilled in the art may use different methods to implement the described functions for each particular application, but it does not need to be considered that the implementation goes beyond the scope of this application.

In the embodiments of this application, the terminal and the network device may be divided into function modules based on the foregoing method examples. For example, each function module may be obtained through division based on each corresponding function, or two or more functions may be integrated in one processing module. The integrated module may be implemented in a form of hardware, or may be implemented in a form of a software function module. It needs to be noted that, in the embodiments of this application, module division is an example, and is merely logical function division. During actual implementation, another division manner may be used. The following uses an example in which each function module is obtained through division based on each corresponding function for description.

Figure 15:
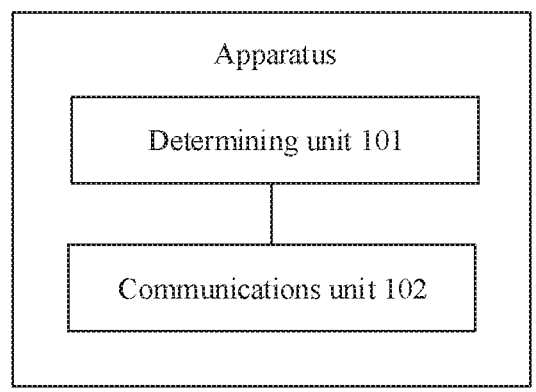
FIG. 15 is a schematic structural diagram 1 of an apparatus according to an embodiment of this application.

FIG. 15 is a schematic structural diagram of an apparatus in the foregoing embodiments. The apparatus may implement a function of the terminal in the method provided in the embodiments of this application. The apparatus may be a terminal or an apparatus that can support the terminal in implementing a function of the terminal in the embodiments of this application. For example, the apparatus is a chip system applied to the terminal. The apparatus includes a determining unit 101 and a communications unit 102. The determining unit 101 may be configured to support the apparatus shown in FIG. 15 in performing steps S101, S1011, S1012, S1013, S1014 and S1015 in the foregoing embodiments. The communications unit 102 may be configured to support the apparatus shown in FIG. 15 in performing steps S102 and S105 in the foregoing embodiments. All related content of the steps in the foregoing method embodiments may be cited in function descriptions of the corresponding function modules. Details are not described herein again.

Optionally, in the embodiments of this application, the chip system may include a chip, or may include a chip and another discrete component.

Optionally, the communications unit in this embodiments of this application may be a circuit, a component, an interface, a bus, a software module, a transceiver, or any other apparatus that may implement communication.

Optionally, the communications unit 102 may be the terminal or a communications interface of the chip system applied to the terminal. For example, the communications interface may be a transceiver circuit. The determining unit 101 may be integrated on the terminal or a processor of the chip system applied to the terminal.

Figure 16:
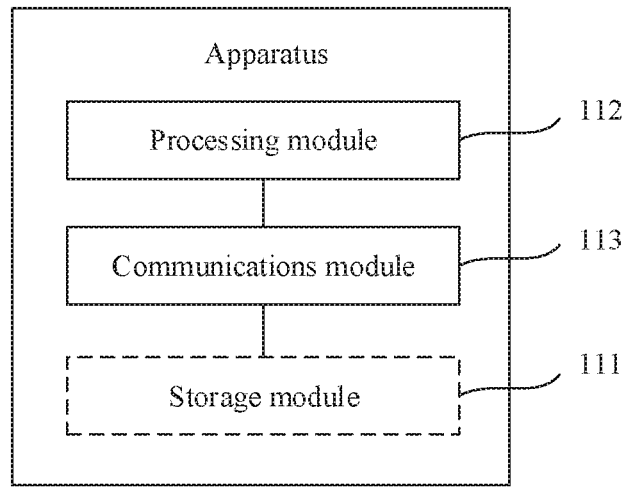
FIG. 16 is a schematic structural diagram 2 of an apparatus according to an embodiment of this application.

FIG. 16 is a schematic diagram of a possible logical structure of an apparatus in the foregoing embodiments. The apparatus may implement a function of the terminal in the method provided in the embodiments of this application. The apparatus may be a terminal or a chip system applied to a terminal. The apparatus includes a processing module 112 and a communications module 113. The processing module 112 is configured to control and manage an action of the apparatus shown in FIG. 16. For example, the processing module 112 is configured to perform the message or data processing step that is performed on the side of the apparatus shown in FIG. 16, for example, configured to support the apparatus shown in FIG. 16 in performing steps S101, S1011, S1012, S1013, S1014 and S1015 in the foregoing embodiments. The communications unit 113 is configured to: support the apparatus shown in FIG. 16 in performing S102 and S105 in the foregoing embodiments; and/or perform another process performed by the apparatus shown in FIG. 16 in the technology described in this specification. Optionally, the apparatus shown in FIG. 16 may further include a storage module 111, configured to store program code and data of the apparatus.

The processing module 112 may be a processor or a controller, for example, may be a central processing unit, a general purpose processor, a digital signal processor, an application-specific integrated circuit, a field programmable gate array or another programmable logic device, a transistor logic device, a hardware component, or any combination thereof. The processing module 112 may implement or execute various example logical blocks, modules, and circuits described with reference to content disclosed in the embodiments of this application. Alternatively, the processor may be a combination of processors implementing a computing function, for example, a combination of one or more microprocessors or a combination of a digital signal processor and a microprocessor. The communications module 113 may be a transceiver, a transceiver circuit, a communications interface, or the like. The storage module 111 may be a memory.

Figure 17:
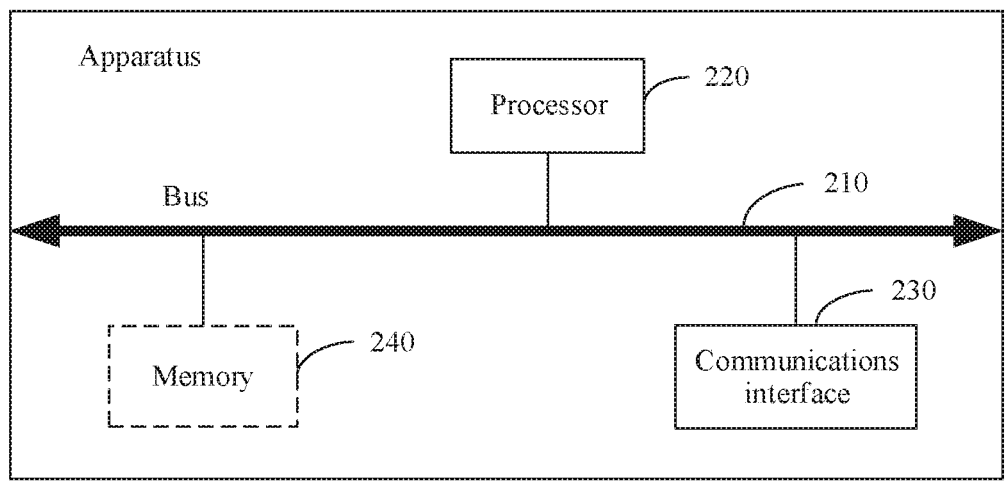
FIG. 17 is a schematic structural diagram 3 of an apparatus according to an embodiment of this application.

When the processing module 112 is a processor 220, the communications module 113 is a communications interface 230 or the transceiver, and the storage module 11 is a memory 240, the apparatus in the embodiments of this application may be a device shown in FIG. 17.

The communications interface 230, at least one processor 220, and the memory 240 are connected to each other by using a bus 210. The bus 210 may be a PCI bus, an EISA bus, or the like. The bus may be classified into an address bus, a data bus, a control bus, and the like. For ease of representation, only one thick line is used to represent the bus in FIG. 17, but this does not mean that there is only one bus or only one type of bus. The memory 240 is configured to store program code and data of the apparatus. The communications interface 230 is configured to support the apparatus in communicating with another device. The processor 220 is configured to support the apparatus in executing the program code stored in the memory 240, to implement the data channel transmission method provided in the embodiments of this application.

Optionally, the memory 240 may be included in the processor 220.

Figure 18:
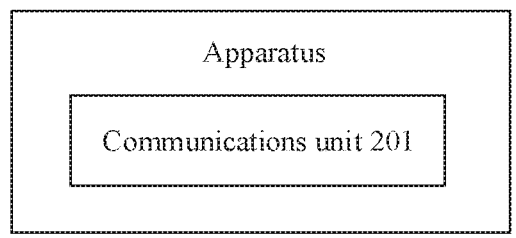
FIG. 18 is a schematic structural diagram 4 of an apparatus according to an embodiment of this application.

FIG. 18 is a schematic diagram of a possible structure of an apparatus in the foregoing embodiments. The apparatus may implement a function of the network device in the method provided in the embodiments of this application. The apparatus may be a network device or a chip system applied to a network device. The apparatus includes a communications unit 201, configured to: support the apparatus shown in FIG. 18 in performing steps S103 and S104 in the foregoing embodiments; and/or perform another process in the technology described in this specification. All related content of the steps in the foregoing method embodiments may be cited in function descriptions of the corresponding function modules. Details are not described herein again.

Optionally, the communications unit 201 may be the network device or a communications interface of the chip system applied to the network device, for example, a transceiver.

Figure 19:
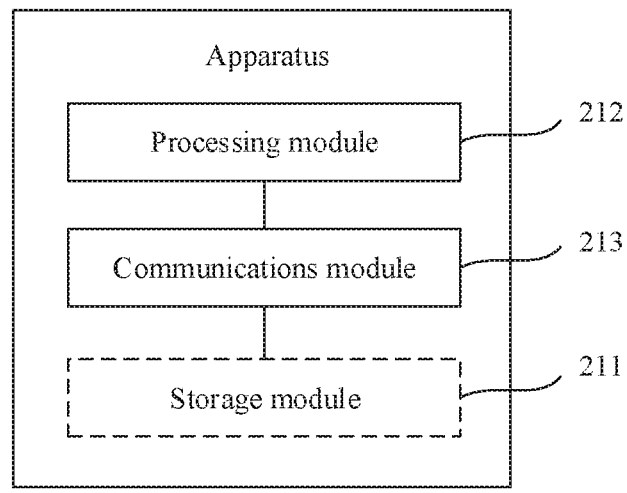
FIG. 19 is a schematic structural diagram 5 of an apparatus according to an embodiment of this application.

FIG. 19 is a schematic diagram of a possible structure of an apparatus in the foregoing embodiments. The apparatus may implement a function of the network device in the method provided in the embodiments of this application. The apparatus may be a network device or a chip system applied to a network device. The apparatus includes a processing module 212 and a communications module 213. The processing module 212 is configured to control and manage an action of the apparatus. For example, the processing module 212 is configured to support the apparatus shown in FIG. 19 in performing the message or data processing operation that is performed on the side of the apparatus shown in FIG. 19 in the foregoing embodiments. The communications module 213 is configured to: support the apparatus shown in FIG. 19 in performing the message or data receiving and sending operation that is performed on the side of the apparatus in the foregoing embodiments, for example, steps S103 and S104 in the foregoing embodiments; and/or perform another process performed by the apparatus shown in FIG. 19 in the technology described in this specification.

Optionally, the apparatus shown in FIG. 19 may further include a storage module 211, configured to store program code and data of the apparatus.

The processing module 212 may be a processor or a controller, for example, may be a central processing unit, a general purpose processor, a digital signal processor, an application-specific integrated circuit, a field programmable gate array or another programmable logic device, a transistor logic device, a hardware component, or any combination thereof. The processing module 212 may implement or execute various example logical blocks, modules, and circuits described with reference to content disclosed in the embodiments of this application. Alternatively, the processor may be a combination of processors implementing a computing function, for example, a combination of one or more microprocessors or a combination of a digital signal processor and a microprocessor. The communications module 213 may be a transceiver, a transceiver circuit, a communications interface, or the like. The storage module 211 may be a memory.

Figure 20:
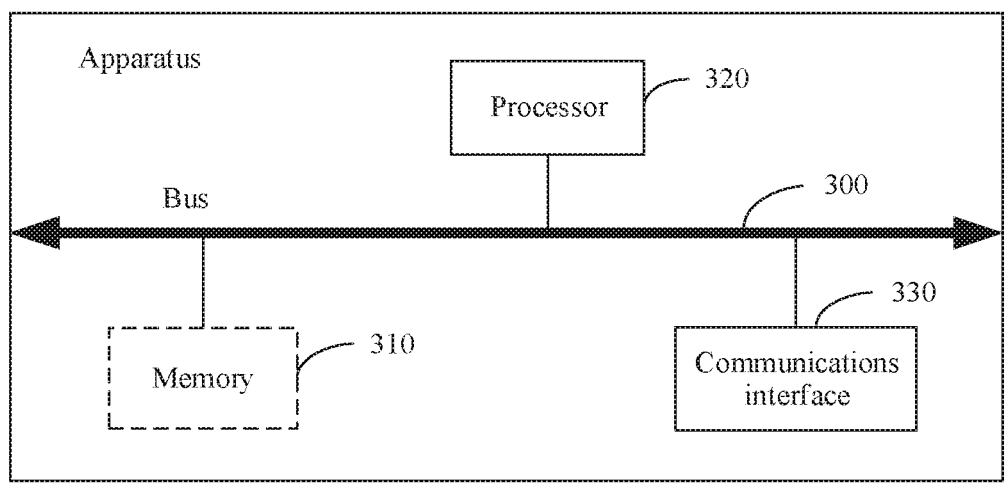
FIG. 20 is a schematic structural diagram 6 of an apparatus according to an embodiment of this application.

When the processing module 212 is a processor 320, the communications module 213 is a communications interface 330 or the transceiver, and the storage module 211 is a memory 310, the apparatus in the embodiments of this application may be a device shown in FIG. 20.

The communications interface 330, at least one processor 320, and the memory 310 are connected to each other by using a bus 300. The bus 300 may be a PCI bus, an EISA bus, or the like. The bus may be classified into an address bus, a data bus, a control bus, and the like. For ease of representation, only one thick line is used to represent the bus in FIG. 20, but this does not mean that there is only one bus or only one type of bus. The memory 310 is configured to store program code and data of the apparatus. The communications interface 330 is configured to support the apparatus in communicating with another device (for example, each apparatus shown in FIG. 15 to FIG. 17). The processor 320 is configured to support the apparatus in executing the program code stored in the memory 310, to implement the data channel receiving method provided in this application.

Optionally, the memory 310 may be included in the processor 320.

In a possible implementation, the apparatuses shown in FIG. 17 and FIG. 20 in this application may alternatively be chip systems. For steps performed by components in the chip systems, refer to the steps performed by the apparatuses shown in FIG. 17 and FIG. 20 in the foregoing embodiments. Details are not described herein again in this application.

All or some of the methods provided in the embodiments of this application may be implemented by software, hardware, firmware, or any combination thereof. When software is used for implementation, all or some of the methods may be implemented in a form of a computer program product. The computer program product includes one or more computer instructions. When the computer program instructions are loaded and executed on a computer, all or some of the procedures or functions described in the embodiments of this application are generated. The computer may be a general-purpose computer, a dedicated computer, a computer network, a network device, a terminal, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by the computer, or a data storage device, such as a server or a data center, integrating one or more usable media. The usable medium may be a magnetic medium (for example, a floppy disk, a hard disk, or a magnetic tape), an optical medium (for example, a digital video disc (DVD)), a semiconductor medium (for example, an SSD), or the like.

According to one aspect, a computer-readable storage medium is provided. The computer-readable storage medium stores an instruction. When the instruction is run on a computer, the computer is enabled to perform S101, S1011, S1012, S1013, S1014, S1015, S102, and S105 in the embodiments, and/or perform another process performed by the terminal or the chip system applied to the terminal in the technology described in this specification. The foregoing readable storage medium may include any medium that can store program code, such as a universal serial bus, a removable hard disk, a read-only memory, a random access memory, a magnetic disk, or an optical disc.

According to another aspect, a computer-readable storage medium is provided. The computer-readable storage medium stores an instruction. When the instruction is run on a computer, the computer is enabled to perform steps S103 and S104 in the embodiments.

According to one aspect, a computer program product including an instruction is provided. When the instruction is run on a computer, the computer is enabled to perform S101, S1011, S1012, S1013, S1014, S1015, S102, and S105.

According to another aspect, a computer program product including an instruction is provided. When the instruction is run on a computer, the computer is enabled to perform steps S103 and S104 in the embodiments.

According to one aspect, a chip system is provided. The chip system includes a processor, and may further include a memory. The chip system is configured to implement S101, S1011, S1012, S1013, S1014, S1015, S102, and S105 in the foregoing embodiments.

According to another aspect, a chip system is provided. The chip system includes a processor, and may further include a memory. The chip system is configured to implement a function of the network device in the foregoing embodiments. The chip system includes at least one processor and an interface circuit. The interface circuit is interconnected to the at least one processor by using a line. The processor is configured to run an instruction, to perform steps S103 and S104 in the embodiments.

In addition, this application further provides a communications system. The communications system includes the terminal shown in any one of FIG. 15 to FIG. 17, and the network device shown in FIG. 18 or FIG. 19.

A person of ordinary skill in the art may be aware that, in combination with units and algorithm steps of the examples described in the embodiments disclosed in this specification, this application may be implemented by electronic hardware or a combination of computer software and electronic hardware. Whether a function is performed by hardware or software depends on particular applications and design constraint conditions of the technical solutions. A person skilled in the art may use different methods to implement the described functions for each particular application, but it does not need to be considered that the implementation goes beyond the scope of this application.

It may be clearly understood by a person skilled in the art that, for the purpose of convenient and brief description, for a detailed working process of the foregoing system, apparatus, and unit, refer to a corresponding process in the foregoing method embodiments. Details are not described herein again.

In the several embodiments provided in this application, it needs to be understood that the disclosed system, apparatus, and method may be implemented in other manners. For example, the described apparatus embodiment is merely an example. For example, the unit division is merely logical function division and may be other division during actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate. Parts displayed as units may or may not be physical units, to be specific, may be located in one position, or may be distributed on a plurality of network units. Some or all of the units may be selected based on actual requirements to achieve the objectives of the solutions of the embodiments.

In addition, functional units in the embodiments of this application may be integrated into one processing unit, or each of the units may exist alone physically, or two or more units are integrated into one unit.

The foregoing descriptions are merely specific implementations of this application, but are not intended to limit the protection scope of the embodiments of this application. Any variation or replacement that can be readily figured out by a person skilled in the art within the technical scope disclosed in the embodiments of this application shall fall within the protection scope of the embodiments of this application. Therefore, the protection scope of the embodiments of this application needs to be subject to the protection scope of the claims.

What is claimed is:

1. A data channel transmission method, comprising:
   determining, by a terminal based on random access configuration information, a first cyclic prefix (CP) length and a preamble sequence that correspond to a random access preamble, the random access configuration information comprising random access preamble information and cyclic shift configuration information;
   determining, by the terminal based on the cyclic shift configuration information, a cyclic shift interval;
   determining, by the terminal based on the cyclic shift interval, a preamble sequence length associated with the preamble sequence, and a time length corresponding to the preamble sequence, a time length corresponding to the cyclic shift interval;
   determining, by the terminal based on the first CP length corresponding to the random access preamble and on the time length corresponding to the cyclic shift interval, a second CP length corresponding to a data channel; and
   sending, by the terminal, the data channel according to the second CP length in a random access process.

2. The method according to claim 1, wherein the second CP length corresponding to the data channel is greater than or equal to a smaller of the first CP length corresponding to the random access preamble or the time length corresponding to the cyclic shift interval.

3. The method according to claim 1, wherein the second CP length corresponding to the data channel is a smallest CP length of one or more third CP lengths, and each of the one or more third CP lengths is greater than or equal to a smaller of the first CP length corresponding to the random access preamble or the time length corresponding to the cyclic shift interval.

4. The method according to claim 1, wherein the second CP length corresponding to the data channel is a CP length that corresponds to N repetitions of a data part of an orthogonal frequency division multiplexing (OFDM) symbol, and N is an integer greater than or equal to 2.

5. The method according to claim 1, wherein the second CP length corresponding to the data channel is greater than or equal to the first CP length corresponding to the random access preamble.

6. The method according to claim 1, wherein the second CP length corresponding to the data channel is greater than or equal to the time length corresponding to the cyclic shift interval.

7. An apparatus, comprising:
   a processor; and
   a communications interface;
   wherein the processor is configured to:
      determine, based on random access configuration information, a first cyclic prefix (CP) length and a preamble sequence that correspond to a random access preamble, the random access configuration information comprising random access preamble information and cyclic shift configuration information;
      determine, based on the cyclic shift configuration information, a cyclic shift interval;
      determine, based on the cyclic shift interval, a preamble sequence length associated with the preamble sequence, and a time length corresponding to the preamble sequence, a time length corresponding to the cyclic shift interval;
      determine, based on the first CP length corresponding to the random access preamble and on the time length corresponding to the cyclic shift interval, a second CP length corresponding to a data channel; and
   wherein the communications interface is configured to send the data channel according to the second CP length in a random access process.

8. The apparatus according to claim 7, wherein the second CP length corresponding to the data channel is greater than or equal to a smaller of the first CP length corresponding to the random access preamble or the time length corresponding to the cyclic shift interval.

9. The apparatus according to claim 7, wherein the second CP length corresponding to the data channel is a smallest CP length of one or more third CP lengths, and each of the one or more third CP lengths is greater than or equal to a smaller of the first CP length corresponding to the random access preamble and the time length corresponding to the cyclic shift interval.

10. The apparatus according to claim 7, wherein the second CP length corresponding to the data channel is a CP length that corresponds to N repetitions of a data part of an orthogonal frequency division multiplexing (OFDM) symbol, and N is an integer greater than or equal to 2.

11. The apparatus according to claim 7, wherein the second CP length corresponding to the data channel is greater than or equal to the first CP length corresponding to the random access preamble.

12. The apparatus according to claim 7, wherein the second CP length corresponding to the data channel is greater than or equal to the time length corresponding to the cyclic shift interval.

13. An apparatus, comprising:
   a processor; and
   a communications interface;
   wherein the communications interface is configured to:
      receive a data channel from a terminal in a random access process, wherein a second cyclic prefix (CP) length corresponding to the data channel is determined based on a first CP length corresponding to a random access preamble and to a time length corresponding to a cyclic shift interval, the time length corresponding to the cyclic shift interval being based on a preamble sequence of the random access preamble, a length of the preamble sequence, and a time length corresponding to the preamble sequence.

14. The apparatus according to claim 13, wherein the second CP length corresponding to the data channel is greater than or equal to a smaller of the first CP length corresponding to the random access preamble and the time length corresponding to the cyclic shift interval.

15. The apparatus according to claim 13, wherein the second CP length corresponding to the data channel is a smallest of one or more third CP lengths, and each of the one or more third CP lengths is greater than or equal to a smaller of the first CP length corresponding to the random access preamble and the time length corresponding to the cyclic shift interval.

16. The apparatus according to claim 13, wherein the second CP length corresponding to the data channel is a CP length that corresponds to N repetitions of a data part of an orthogonal frequency division multiplexing (OFDM) symbol, and N is an integer greater than or equal to 2.

17. The apparatus according to claim 13, wherein the second CP length corresponding to the data channel is greater than or equal to the first CP length corresponding to the random access preamble.

18. The apparatus according to claim 13, wherein the second CP length corresponding to the data channel is greater than or equal to the time length corresponding to the cyclic shift interval.

19. The apparatus according to claim 13, wherein lengths of the first CP length and the second CP length are different.

* * * * *